United States Patent Office 3,767,825
Patented Oct. 23, 1973

3,767,825
METHOD OF COATING FOOD PARTICLES WITH A BLEND OF VITAMINS A AND C
Paul A. Hammes, Westfield, and Melvin J. Boroshok, Yonkers, N.Y., assignors to Merck & Co., Inc., Rahway, N.J.
No Drawing. Filed June 18, 1971, Ser. No. 154,595
Int. Cl. A23l 1/30
U.S. Cl. 426—290                              2 Claims

ABSTRACT OF THE DISCLOSURE

A vitamin containing coating is made up of vitamin A beadlets and vitamin C having a wax-like coating thereon that becomes tacky at 40°–60° C. It is dusted on hot food particles and it adheres thereto as a coating.

---

This invention relates to vitamin-containing coatings on food products and particularly to the preparation of a vitamin-containing composition and to a method for applying it to foods.

The vitamins which are to be used are the water soluble vitamin C and the oil soluble vitamin A. Obviously, neither an oil nor water can be used to make a solution of them, assuming that one has in mind the formation of an atomizable liquid which is to be sprayed on a food. Emulsion of the two vitamins have been considered but this involves the use of an emulsifying agent which is both costly and which may not be physiologically acceptable to persons.

One feature of the invention is the preparation of a composition which contains both the vitamin A and the vitamin C in a form which can be readily applied to foods to form a vitamin-containing coating on them.

A food to which the coating is especially adaptable is potato flakes which are to be restored by the addition of water to a consumable form such as mashed potatoes. The invention can, however, be applied to potato chips, cereal flakes, popcorn, crackers and practically every dry food item which is more or less in "bite-size."

To make it possible to apply the water soluble vitamin C and the water insoluble vitamin A to the selected food, this feature of the invention involves the use of commercially obtainable vitamin A beadlets and an especially coated vitamin C. The vitamin A beadlets are to be used in the form in which they are purchased; they may, for example, be prepared in accordance with the disclosure of U.S. Pat. 3,099,602. The commercial vitamin C must be coated to practice this invention and may be accomplished by using a fatty acid of 12 to 20 carbon atoms such as stearic acid or by using a mono-glyceride of one of them, or their mixtures. A representative process is the following:

COATED ASCORBIC ACID

A 90% coated ascorbic acid was made by using commercial stearic acid in the following procedure:

(I) Formula

| Ingredient: | Quantity |
|---|---|
| (1) Ascorbic acid, USP Med Crystal 30–80 mesh | gm__ 540.0 |
| (2) Myverol 18-07 (stearic acid) | gm__ 60.0 |
| Total of dry ingredients | gm__ 600.0 |
| (3) Chloroform | ml__ 125 |

(II) Process (A) In a vessel place (3), add (2), and heat to 50° C. Stir until a clear solution results.

(B) In a small Hobart or other mixer, place (1), then pour (A) and mix until uniformly wet. Continue mixing until almost dry due to chloroform evaporation.

(C) Pass the mass through a stainless steel #8 to #100 gauge sieve.

(D) Spread on paper and dry in an oven at 40° C. to remove any residual chloroform.

(III) Appearance

White free flowing dry material.—Any of the other fatty acids or their monoglycerides, or mixtures may be substituted in the above process. Also, the amount may range from 30 to 120 grams to get a thinner or thicker coating.

The coated ascorbic acid is blended with the vitamin A beadlets in a ratio of 7 to 30 grams, preferably 15 gms., of the coated ascorbic acid per gram of vitamin A beadlets. An important physical property of this blend is that it does not tend to stratify or segregate during shipping and handling in its actual application to the foodstuff. A representative blend using ascorbic acid which has been coated as above, is the following:

EXAMPLE 1

Vitamin C-Vitamin A Dry Mix

Coated vitamin C and vitamin A pellets were blended in a ratio to give a potency of 1000 actual vitamin A units per 50 mg. of actual vitamin C content.

(I) Formula

| Ingredient: | Quantity, gm. |
|---|---|
| (1) Coated ascorbic acid, 90% vitamin C content | 200.0 |
| (2) Vitamin A palmitate, 250,000 units vitamin A per gm. (Dry beadlets, Type 250–CW, cold water dispersible) | 14.39 |
| Total | 214.39 |

(II) Process (A) Blend (1) and (2) using a twin shell or ribbon or other conventional blender.

(III) Appearance

A white preparation-free flowing. When this blend was applied to a glass slide and heated to around 50° C. the material adhered to the slide when cooled. This is because the coating on the ascorbic acid attaches to the slide and also binds the vitamin A beadlets to it. As a result, the water soluble vitamin C and the oil soluble vitamin A becomes attached to the slide in the form of a substantially continuous coating.

EXAMPLE 2

In Example 1 the vitamin A can be altered in amount so that per 1000 actual vitamin A units there is from 25 to 100 mg. of actual vitamin C content.

EXAMPLE 3

In Example 1 or 2 instead of using ascorbic acid, the invention contemplates the substitution of potassium or sodium ascorbate, their mixture or mixtures with ascorbic acid.

EXAMPLE 4

In Example 1 or 2, the vitamin A beadlets can be replaced by a dry product made in accordance with the broad teachings of said patent.

The above blends may be sold in this form to food processing companies. The blend is a dry product which becomes tacky at 40°–60° C. depending on the exact melting point of the coating on the vitamin C, but which maintains its discrete granular form. To practice the invention, it is dusted on the food which is at the temperature at which the blend is tacky as this causes the blend to adhere to the food surface. The product can then be allowed to cool in the ambient air or cool air may be directed on it to hasten the attachment of the coating composition to the food.

EXAMPLE 5

This example illustrates the method of applying the coating blend of one of the above examples to potato flakes. The apparatus and process of Pat. 2,034,599 is used and a soft mashed potato sludge is placed in the trough between plates 16 in FIG. 2. It is picked up by and dried on drums 5 and scraped off by blades 17. It falls, as flakes, in conveyor trough 18 and the vitamin blend is dusted onto the still warm flakes as they are agitated and moved along by conveyor 19. The blend will adhere to the flakes and remain on them due to the cooling further along the conveyor.

EXAMPLE 6

This example illustrates the application of the coating blend of one of the above examples to potato chips. This is accomplished by dusting the chips after they are taken out of the frying vat and are still hot with the blend in the same manner that salt is dusted on them.

EXAMPLE 7

This example illustrates the application of the coating blend of one of the above examples to popcorn. This is readily done by dusting the popped corn with the vitamin blend in the same manner that salt is dusted on the popped corn.

EXAMPLE 8

This example illustrates the application of the coating blend of one of the above examples to crackers. As the crackers come out of the baking oven, such as on a continuously moving conveyor belt, they are dusted with the dry vitamin blend. It will be appreciated that the relative amount of the blend which is applied to the particular food may vary within wide limits. It can be very minimal so that a continuous film on the food is not formed and so that it is scattered on the food surface much as if it were table salt. The maximal amount is about that at which a continuous or nearly continuous film is formed on the food. Whether it adheres to the food as a continuous or a discontinuous film, it is present thereon as a nutrient supplement to the consumer's daily intake.

What is claimed is:

1. The method of coating food particles with a vitamin A and vitamin C blend which involves initially coating vitamin C with a wax-like material which becomes tacky at 40–60° C., blending this with vitamin A beadlets in the ratio of 25 to 100 mg. of vitamin C per 1000 units of vitamin A, dusting this blend on the food particles which are at a temperature of from 40–60° C. whereby the blend becomes tacky and adheres to the food particles, and then cooling the coated food particles.

2. The method of claim 1 in which said wax-like material is selected from the group consisting of fatty acids having from 12 to 20 carbon atoms, their mono-glycerides and their mixtures.

References Cited
UNITED STATES PATENTS

| | | | |
|---|---|---|---|
| 3,293,131 | 12/1966 | Ely et al. | 99—11 X |
| 3,338,717 | 8/1967 | Halin | 99—11 X |
| 3,497,589 | 2/1970 | Barenstein | 99—11 X |

RAYMOND N. JONES, Primary Examiner

U.S. Cl. X.R.

424—38, 280; 426—72, 311